United States Patent [19]

Leonardo et al.

[11] 3,860,607

[45] Jan. 14, 1975

[54] PROCESS FOR PREPARING HYDROXY-L-PROLINE OR N-ACETYL-HYDROXY-L-PROLINE FROM HYDROLYZED GELATIN

[75] Inventors: Onofrio Leonardo; Giacomo Giorgio; Francesco Esposito, all of Naples, Italy

[73] Assignee: Richardson-Merrell S.p.A., Naples, Italy

[22] Filed: Dec. 15, 1972

[21] Appl. No.: 315,305

[30] Foreign Application Priority Data
Jan. 19, 1972  Italy .................................. 47815/72

[52] U.S. Cl. .............................................. 260/326.2
[51] Int. Cl. ............................................. C07d 27/04
[58] Field of Search ................................. 260/326.2

[56] References Cited
UNITED STATES PATENTS
3,478,055   11/1969   Shirakura et al. ............... 260/326.2

*Primary Examiner*—Joseph A. Narcavage
*Attorney, Agent, or Firm*—George W. Rauchfuss, Jr.; Eugene O. Retter

[57] ABSTRACT

A process of preparing hydroxy-L-proline starting from hydrolyzed animal gelatin, the improvement which comprises acetylating the hydrolyzed gelatin compounds, benzoylating the acetylated solution, separating N-acetyl-O-benzoyl-hydroxy-L-proline from this solution and then hydrolyzing in alkaline or acidic medium.

7 Claims, No Drawings

PROCESS FOR PREPARING HYDROXY-L-PROLINE OR N-ACETYL-HYDROXY-L-PROLINE FROM HYDROLYZED GELATIN

This invention relates to a process for preparing hydroxy-L-proline or N-acetyl-hydroxy-L-proline from hydrolyzed gelatin.

More particularly, the subject of this invention is a process for preparing the aforesaid substances by respectively acidous and alkaline hydrolysis of N-acetyl-O-benzyol-hydroxy-L-proline obtained by acetylating and then benzoylating the hydrolyzed gelatin containing all the essential aminoacids.

It is known that hydroxy-L-proline derivatives and particularly N-acetyl-hydroxy-L-proline are used as therapeutical agents for the treatment of the connective tissue disorders. They are generally obtained from hydroxy-L-proline. Therefore, the preparation of this hydroxy-aminoacid is particularly important.

Hydroxy-L-proline is a normal component of many proteins having animal origin, but it is mostly represented in the gelatin which is, therefore, the starting material for its industrial preparation. Plans for a chemical synthesis of hydroxy-L-proline were suggested, but they have no practical importance if considering that every chemical synthesis produces all four of the possible isomers from which it is then necessary to separate the L form.

There are many references about the separation methods of hydroxy-L-proline from hydrolyzed gelatin, but the methods are too laborious and expensive. In Japanese Pat. No. 3,371 (1955) it is suggested to eliminate the desired amine from the aminoacids which are different from proline or hydroxyproline by treatment with sodium nitrite and then decomposing the nitrous derivatives of proline and hydroxyproline.

A reference by R. L. M. Synge (Bioch. J. 33, 1931; 1939) describes a method of removing arginine from hydrolyzed gelatin by precipitation with flavianic acid, pointing out that without this removal of arginine it is not possible to recover hydroxy-L-proline. The same method is described in the East German Pat. No. 39,878 and in the West German Pat. No. 1,119,871.

Other methods have been suggested to separate the aminoacids, taking advantage of the different solubility either of them or of the organic or inorganic addition salts of the aminoacids obtained from the hydrolyzed gelatin. But the most relevant reference to our invention is the Synge article since, according to this invention too, the N-acetyl-O-benzoyl-hydroxy-L-proline is separated as intermediate both for N-acetyl-hydroxy-L-proline and for hydroxy-L-proline.

A novel characteristic of this invention is that arginine is not removed from the hydrolyzed solution and the separation of acetyl-benzoyl-hydroxy-L-proline is obtained in good yields and a good purity degree in spite of what is quoted by the previous technical literature. That enables one to produce a less expensive hydroxy-aminoacid or its acetyl derivative according to this invention. In fact, the process according to this invention consists of fewer operations, does not require the use of expensive reagents and finally gives greater yields than those previously described.

N-acetyl-hydroxy-L-proline is prepared according to the methods described in the literature by acetylating the hydroxy-L-proline or by alkaline saponifying of N-acetyl-O-benzoyl-hydroxy-L-proline as particularly described by Synge in the reported reference.

The compounds according to this invention are prepared starting from the animal gelatin, according to a treatment characterized by the following phases: hydrolysis, acetylation of the hydrolyzed product, benzoylation of the acetylated solution, and alternatively acidic or alkaline hydrolysis of the N-acetyl-O-benzoyl-hydroxy-L-proline obtained. Hydrolysis of the gelatin is performed according to methods widely used and very well known in the art. The solution of the hydrolyzed product, corresponding to 0.5 to 1 Kg of gelatin in a liter of solution, is acetylated with acetic anhydride under stirring at a temperature between 0° and 5°C.

Since the acetylation reaction has to be performed at substantially neutral pH, the reaction mixture has to be added substantially simultaneously to acetic anhydride and a concentrated solution of alkaline hydroxide. The addition of acetic anhydride and alkaline hydroxide may be continuous or with many interruptions during the reaction. The latter is in order to avoid an increase of the acetic anhydride which has not reacted, correct suitably the pH of the solution and maintain the temperature in the range of 0° to 5°C. The reaction mixture, without further purification, may be used in the subsequent benzoylation reaction.

The benzoylation reaction with benzoyl chloride may be performed in the presence or absence of a water miscible solvent. According to the invention, we prefer using acetone, but any other suitable water miscible solvent may be used, such as, for example, tetrahydrofuran, dioxan, dimethylformamide, and the like. If the reaction is performed in the absence of solvent, the adding of benzoyl chloride is made under stirring. In order to obtain good yields from the reaction and to have the reaction product separated with a good purity degree, the reaction must be performed at a temperature between 0° and 5°C. with a pH as substantially neutral as possible. The adding of benzoyl chloride is made simultaneous with a solution of alkaline hydroxide continuously or with many interruptions so as to avoid an increase of benzoyl chloride in the reaction mixture. During the suspension of the addition of the reagents it is possible to suitably correct the pH of the solution.

To have a good benzoylation it is important to stir strongly, cool effectually, and control the pH which must always be kept substantially near 7.

After benzoylation the reaction mixture is acidified and extracted with chloroform. The chloroformic solutions are washed with water and concentrated under vacuum, the residue is first treated with ethyl ether under stirring and then left to settle for one hour then filtered. The N-acetyl-O-benzoyl-hydroxy-L-proline obtained may be used as such in the subsequent operations.

By acidic hydrolysis of the acetyl-benzoyl derivative one obtains hydroxy-L-proline. According to the invention, using hydrochloric acid is preferred, but it is possible to use any other strong acid or cationic resin. The hydrolysis temperature may be chosen from the interval between room temperature and the boiling point of the solution. The time is from about 18 hours to 2 days. The excess hydrochloric acid is removed from the reaction mixture and the solution treated with an anionic resin such as I.R.A. 68 Amberlite (free base). After being filtered the solution is concentrated to a small volume by treatment with methanol and hydroxy-L-proline is separated with a good purity degree.

If hydrolysis of acetyl-benzoyl-hydroxyproline is performed in an alkaline medium one obtains N-acetyl-hydroxy-L-proline. In the process according to the invention sodium hydroxide is used by it is apparent that any other suitable strong base may be used, such as, for example, potassium hydroxide, barium hydroxide, calcium hydroxide and the like. The alkaline reaction is performed at room temperature for 3 to 8 hours. The reaction mixture is then treated with a cationic resin and filtered. The filtered solution is concentrated and poured over a cationic resin such as IR 120 (H$^+$) Amberlite. The eluate is washed with chloroform, decolorized with animal carbon, filtered and dried. The residue is crystallized with acetone.

Examples hereinafter described do not limit our invention.

EXAMPLE 1

Hydrolysis of gelatin

A mixture of 34 Kg of ¾° Engler technical gelatin, 20.5 liters of water and 47.5 liters of 34% commercial hydrochloric acid, is heated and refluxed for 6 hours in a Pfaudler type reactor of 100 liters. The reaction mixture, cooled to 20°C. is decolorized with 1.2 Kg of coal which is removed by filtration. The solution is then concentrated to dryness under vacuum. The oily residue added to 15 liters of water is concentrated to dryness and the residue is dissolved in water once again to reach a final volume of 46 liters. The hydroxy-L-proline yield is 98% compared to the quantity present in the starting gelatin.

EXAMPLE 2

Acetylation of hydroxy-L-proline

Eleven liters of the hydrolyzed product obtained in the previous example are neutralized with 4.9 liters of 45% sodium hydroxide at a temperature between 5° and 10°C. The reaction mixture is cooled to 0°C. under stirring, 9 liters of acetic anhydride and 29.9 liters of 8N sodium hydroxide are added, keeping the reaction temperature at 0° to 1°C. Addition is made in 10 running stages each of 20 minutes while keeping the pH of the solution neutral during the reaction. The acetylated yield is of 98–100% which is determined by the ninidrine method.

EXAMPLE 3

Benzoylation of N-acetyl-L-hydroxy-proline

A. An acetylated solution of 8 liters of the product obtained in Example 2, diluted in 16 liters of water, is cooled to 0°C. Then 1.05 liters of benzoyl chloride and 8 liters of 2N sodium hydroxide are added in 30 minutes with stirring keeping the temperature in the range of 0°–3°C. When the addition is completed, the reaction mixture is kept under stirring for 2 hours longer at 0°–3°C. and at a neutral pH. The reaction mixture is then made acidic to pH 1 by adding 5 liters of 34% hydrochloric acid while still stirring at 0°C.

After extraction with chloroform the organic phase is washed with water and concentrated under vacuum. The residue is made mushy with ethyl ether (4–5 liters), stirring for 30 minutes and left to settle for 40 minutes at 4°C. It is filtered, the precipitate, which is N-acetyl-O-benzoyl-hydroxy-L-proline, is dried under vacuum. Yield 160 grams. M.P. 175°C. $[\alpha]_D^{20} = -40.4°$.

A sample is crystallized with chloroform-ethyl ether. M.P. 183°–184°C.

B. 2.8 liters of acetylated solution of the compound obtained in Example 2, dissolved in 280 cc of acetone, are added under stirring to 8 cc of benzoyl chloride and 80 cc of 2N sodium hydroxide so that the temperature does not exceed 0°C. It is stirred for 30 minutes longer, the pH of the solution is controlled and kept at neutrality by adding 2N NaOH or acetic acid. The same quantity of benzoyl chloride is added in the same reaction condition as described above to obtain 80 cc of benzoyl chloride and 800 cc of 2N NaOH. The mixture is stirred for 90 minutes at 0°C. The acetone is then removed under vacuum evaporation. The residue is diluted with 250 cc of water and made acidic with 600 cc of concentrated hydrochloric acid. It is extracted with chloroform, the organic phase is washed with water, concentrated under vacuum and the residue is crystallized with a liter of ethyl ether. Yield 12 grams of N-acetyl-O-benzoyl-hydroxy-L-proline. M.P. 170°–176°C. without depression with a sample prepared in a different way. $[\alpha]_D^{20} = -35°$.

EXAMPLE 4

N-acetyl-hydroxy-L-proline 150 grams of N-acetyl-O-benzoyl-hydroxy-L-proline and 600 cc of 2N NaOH are maintained with stirring at room temperature for 5 hours. 750 cc of IR 120 (H$^+$) Amberlite resin are added and the mixture is stirred for 30 minutes longer. A large quantity of precipitate is obtained which is benzoic acid. It is filtered and the residue is washed several times with water so that the filtered product reaches the final volume of 4 liters. This solution is precolated over a column of IR 120 (H$^+$) Amberlite resin. The eluate is concentrated at 40°C. and under vacuum to a volume of 450 cc which are extracted with 200 cc of chloroform. The aqueous solution is decolorized with 6 grams of animal coal, filtered and dried. The residue is made mushy in 270 cc of acetone and left to crystallize for 30 minutes. It is filtered and the precipitated compound is dried under vacuum. 84.5 grams of monohydrate N-acetyl-hydroxy-L-proline are obtained. M.P. 74°–76°C. This compound, kept under vacuum at 55°C. for 10 hours, loses the water molecules so that 76 grams of anhydrous N-acetyl-hydroxy-L-proline are obtained. From the crystallization water a further 6.5 grams of anhydrous product are obtained. Total yield 82.5 grams. M.P. 126°–128°C. $[\alpha]_D^{18} = 119.5$ (H$_2$O; c = 3.75).

EXAMPLE 5

Hydroxy-L-proline

A mixture of 50 grams of N-acetyl-O-benzoyl-hydroxy-L-proline, 300 cc of 34% HCl, and 200 cc of water are refluxed for 18 hours. The reaction mixture is cooled to room temperature and extracted twice with 100 cc of chloroform. The aqueous solution is concentrated under vacuum, added to water and then concentrated once more. This operation is repeated several times to remove the excess hydrochloric acid. The final residue is dissolved in 500 cc of water and treated with 165 cc of IRA 68 Amberlite resin (free base). It is filtered, the resin is washed with water, the aqueous solutions are collected and decolorized with coal, filtered and concentrated to dryness. To the concentrated compound 250 cc of methanol are added: hydroxy-L-proline crystallizes which is then filtered and dried. Yield 22.5 grams. $[\alpha]_D^{22} = -75°$ (water; c = 2.37).

| | | | |
|---|---|---|---|
| Calculated for $C_5H_9NO_3$ | 45.79%C | 6.91%H | 10.68%N |
| Found | 45.58 | 6.87 | 10.44 |

This invention has been described referring particularly to specific methods, but it is obvious that this fact does not limit our invention and changes can be made.

1. In a process of preparing hydroxy-L-proline and the N-acetyl derivative thereof starting from hydrolyzed animal gelatin solution the improvement, wherein the necessity for removing arginine from the hydrolyzed gelatin is eliminated, which comprises acetylating the hydrolyzed gelatin solution with acetic anhydride and an alkaline hydroxide at substantially neutral pH with stirring at a temperature of from 0° to 5°C., benzoylating the acetylated solution with benzoyl chloride and an alkaline hydroxide at substantially neutral pH with stirring at a temperature of from 0° to 5°C., separating the N-acetyl-O-benzoyl-hydroxy-L-proline from this benzoylated solution and then hydrolyzing the N-acetyl-O-benzoyl-hydroxy-L-proline in an alkaline medium to produce N-acetyl-hydroxy-L-proline or in an acidic medium to produce hydroxy-L-proline.

2. A process according to claim 1 wherein N-acetyl-hydroxy-L-proline is prepared by hydrolyzing N-acetyl-O-benzoyl-hydroxy-L-proline in an alkaline medium.

3. A process according to claim 1 wherein hydroxy-L-proline is prepared by hydrolyzing N-acetyl-O-benzoyl-hydroxy-L-proline in an acidic medium.

4. A process according to claim 1 wherein the acetylated solution is diluted with a water miscible solvent before benzoylation.

5. A process according to claim 4 wherein the solvent is acetone.

6. A process according to claim 5 wherein N-acetyl-hydroxy-L-proline is prepared by hydrolyzing N-acetyl-O-benzoyl-hydroxy-L-proline in an alkaline medium.

7. A process according to claim 5 wherein hydroxy-L-proline is prepared by hydrolyzing N-acetyl-O-benzoyl-hydroxy-L-proline in an acidic medium.

* * * * *